(12) United States Patent
Liao (10) Patent No.: US 8,335,473 B2
(45) Date of Patent: *Dec. 18, 2012

(54) SOCIAL INTERACTION TRACKING

(75) Inventor: Robert H. Liao, Chestnut Hill, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,885

(22) Filed: Jan. 30, 2012

(65) Prior Publication Data

US 2012/0135690 A1 May 31, 2012

Related U.S. Application Data

(63) Continuation of application No. 12/276,698, filed on Nov. 24, 2008, now Pat. No. 8,140,014.

(51) Int. Cl.
*H04B 7/00* (2006.01)

(52) U.S. Cl. .......................................... 455/41.2; 726/2
(58) Field of Classification Search ................. 445/41.2; 726/2
See application file for complete search history.

(56) References Cited

U.S. PATENT DOCUMENTS

| 6,876,326 B2 * | 4/2005 | Martorana | 342/463 |
| 2008/0072284 A1 * | 3/2008 | Horvitz et al. | 726/2 |
| 2009/0271244 A1 * | 10/2009 | Kalasapur et al. | 705/10 |

* cited by examiner

*Primary Examiner* — Joseph Chang (57) ABSTRACT

A device may include a communication interface configured to transmit and receive communications from a second device. The device may further include logic configured to determine whether a user of the device is in a social interaction with a user of the second device, obtain identification information associated with the second device when the user of the device is in a social interaction with the user of the second device, and store the obtained identification information associated with the second device to track the social interaction with the user of the second device.

20 Claims, 8 Drawing Sheets

| 610 | 620 | 630 | 640 |
|---|---|---|---|
| 1287 | 8:31 PM | 00:03:28.30 | B-7 |
| 1426 | 8:40 PM | 00:14:30.00 | C-18 |
| 123 | 8:50 PM | 00:04:30.00 | C-18 |
| 786 | 9:00 PM | 00:04:56.00 | A-23 |
| 987 | 9:12 PM | 00:02:18.20 | D-21 |
| 675 | 9:13 PM | 00:08:14.27 | H-2 |
| ... | ... | ... | ... |
| 1131 | 9:20 PM | 00:12:11.54 | AA-12 |

SOCIAL INTERACTION TRACKING

CROSS-REFERENCE TO RELATED APPLICATION

This application is a continuation of U.S. patent application Ser. No. 12/276,698, filed on Nov. 24, 2008, the entirety of which is hereby incorporated by reference herein.

BACKGROUND INFORMATION

As mobile consumer electronic devices, such as mobile phones, personal digital assistants (PDAs), portable gaming devices, etc., have become increasingly ubiquitous, the public's general reliance on these devices for facilitating management of social interactions has also risen. For example, when meeting a person for the first time, it is not uncommon for one to ask for a phone number and immediately enter the number into their mobile phone's address book, rather than write the number down on a piece of paper that may be lost. Unfortunately, existing devices require significant interaction on the part of the exchange participants and also fail to adequately address large amounts of social interaction information.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Implementations described herein relate to a device, method, and system for facilitating the observation and tracking of social interactions between device users. In some implementations, a mobile telephone or other portable electronics device may include one or more transceiver mechanisms for locating and identifying other electronic devices. Logic associated with the device may be configured to track interactions with other identified devices based on a set of predetermined conditions. Logic associated with the device may be further configured to ascertain and track a geospatial location of the device through the duration of a social interaction experience. In other implementations, an interface may be provided for reviewing and retrieving information corresponding to a tracked social experience.

Figure 1:
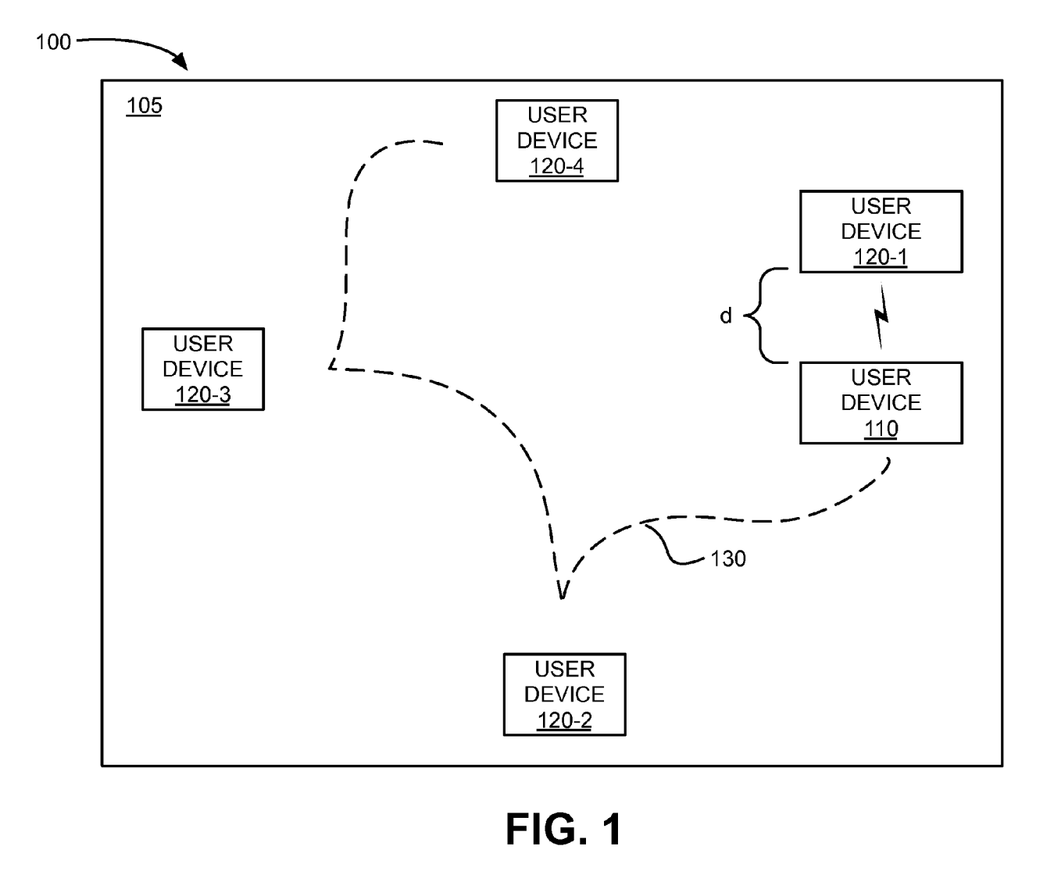
FIG. 1 illustrates an exemplary system in which systems and methods described herein may be implemented.

FIG. 1 is a block diagram of an exemplary system 100 in which systems and methods described herein may be implemented. System 100 may include an environment 105, a first user device 110, a plurality of user devices 120-1 to 120-4 (collectively referred to as user devices 120) with which user device 110 may interact during a social interaction experience, and a path 130 indicating a path followed by first user device 110 during a social interaction session. As shown, a user of first user device 110 may socially interact with one or more users of devices 120-1 to 120-4 during the user interaction session. Proximity between devices 110 and 120 may be represented by distance "d" in FIG. 1. As will be described in detail below, user devices 110 and 120 may connect with each other via wireless communication mechanisms.

Each of user devices 110 and 120 may include a cellular radiotelephone, personal digital assistant (PDA), pager with data communications and/or data processing capabilities, or other suitable electronic communications device capable of interacting with other user devices in the manner set forth below. For example, user devices 110 and 120 may include a mobile telephone, PDA, gaming device, global positioning system (GPS)-capable device, or other portable device, such as a smart label or tag, embodiments of which are discussed below. In an alternative implementation, one or more of user devices 110 and 120 may include a personal computer (PC), laptop computer, palmtop receiver, remote control device and/or any other appliance that may include a radiotelephone transceiver and other applications for providing data processing and data communication functionality.

The exemplary configuration illustrated in FIG. 1 is provided for simplicity. It should be understood that a typical system may include more or fewer devices than illustrated in FIG. 1. For example, other devices that facilitate communications between the various entities illustrated in FIG. 1 may also be included in system 100. In addition, user devices 110 and 120-1 to 120-4 are each shown as separate elements. In other instances, the functions described as being performed by two or more user devices may be performed by a single user device. In other implementations, the functions described as being performed by one user device may be performed by another user device or by multiple user devices.

Figure 2:
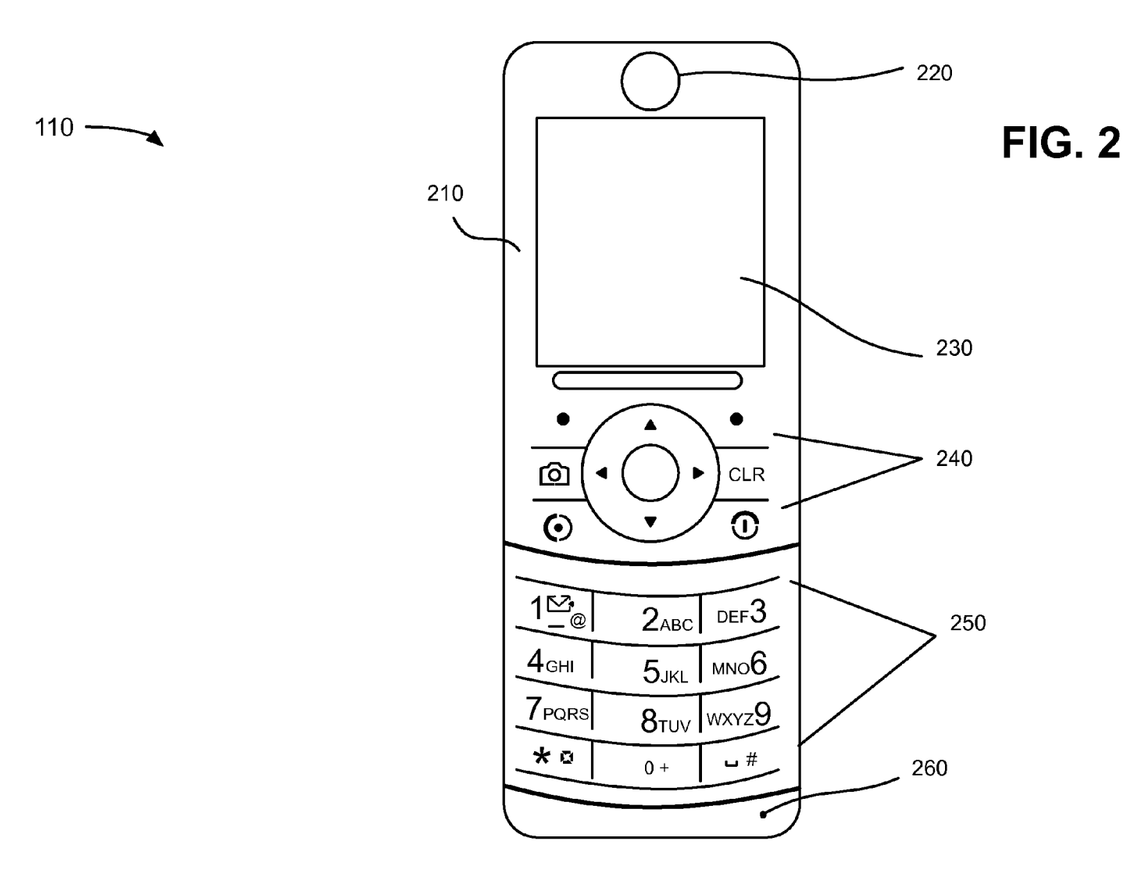
FIG. 2 is a diagram of an exemplary user device of FIG. 1.

FIG. 2 is a diagram of an exemplary user device 110 in which methods and systems described herein may be implemented. Referring to FIG. 2, user device 110 may include housing 210, speaker 220, display 230, control buttons 240, keypad 250, and microphone 260. Housing 210 may protect the components of user device 110 from outside elements. Speaker 220 may provide audible information to a user of user device 110. For example, speaker 220 may provide ringtones, beeping sounds or other sounds to alert the user to an event. For example, speaker 220 may be configured to output an alert relating to an identification of another in range device. In this implementation, device 110 may be configured to provide an interface (e.g., a key press, a menu option, etc.) for enabling the user to connect to or otherwise engage with the identified device. Speaker 220 may also output audio information or instructions to a user of user device 110.

Display 230 may provide visual information to the user. For example, display 230 may include a liquid crystal display (LCD), a touch screen display or another type of display used to provide information to a user, such as provide information regarding incoming or outgoing telephone calls and/or incoming or outgoing electronic mail (email), instant messages (e.g., mobile instant messages (MIMs), short message service (SMS) messages, multi-media message service (MMS) messages, etc. Display 230 may also display information regarding various applications, such as a social interaction program, a calendar application or text message application stored in user device 110, the current time, video games being played by a user, downloaded content (e.g., news or other information), etc.

Control buttons 240 may permit the user to interact with user device 110 to cause user device 110 to perform one or more operations, such as send communications (e.g., text messages or multi-media messages), place a telephone call, play various media, etc. For example, control buttons 240 may include a send button, an answer button, a dial button, a hang up button, a clear button, a play button, etc. In an exemplary implementation, control buttons 240 may also include one or more buttons that may be used to launch an application program, such as a messaging program. Further, one of control buttons 240 may be a menu button that permits the user to view options associated with executing various application programs, such as a social interaction program, stored in user device 110.

Keypad 250 may include a telephone keypad. As illustrated, many of the keys on keypad 250 may include numeric values and various letters. For example, the key with the number 2 includes the letters A, B and C. These letters may be selected by a user when inputting text to user device 110. Other keys on keypad 250 may include symbols, such as the plus symbol (i.e., +), the minus symbol (i.e., -), the at symbol (i.e., @), etc. These symbols may be used to perform various functions. Microphone 260 may receive audible information from the user.

Figure 3:
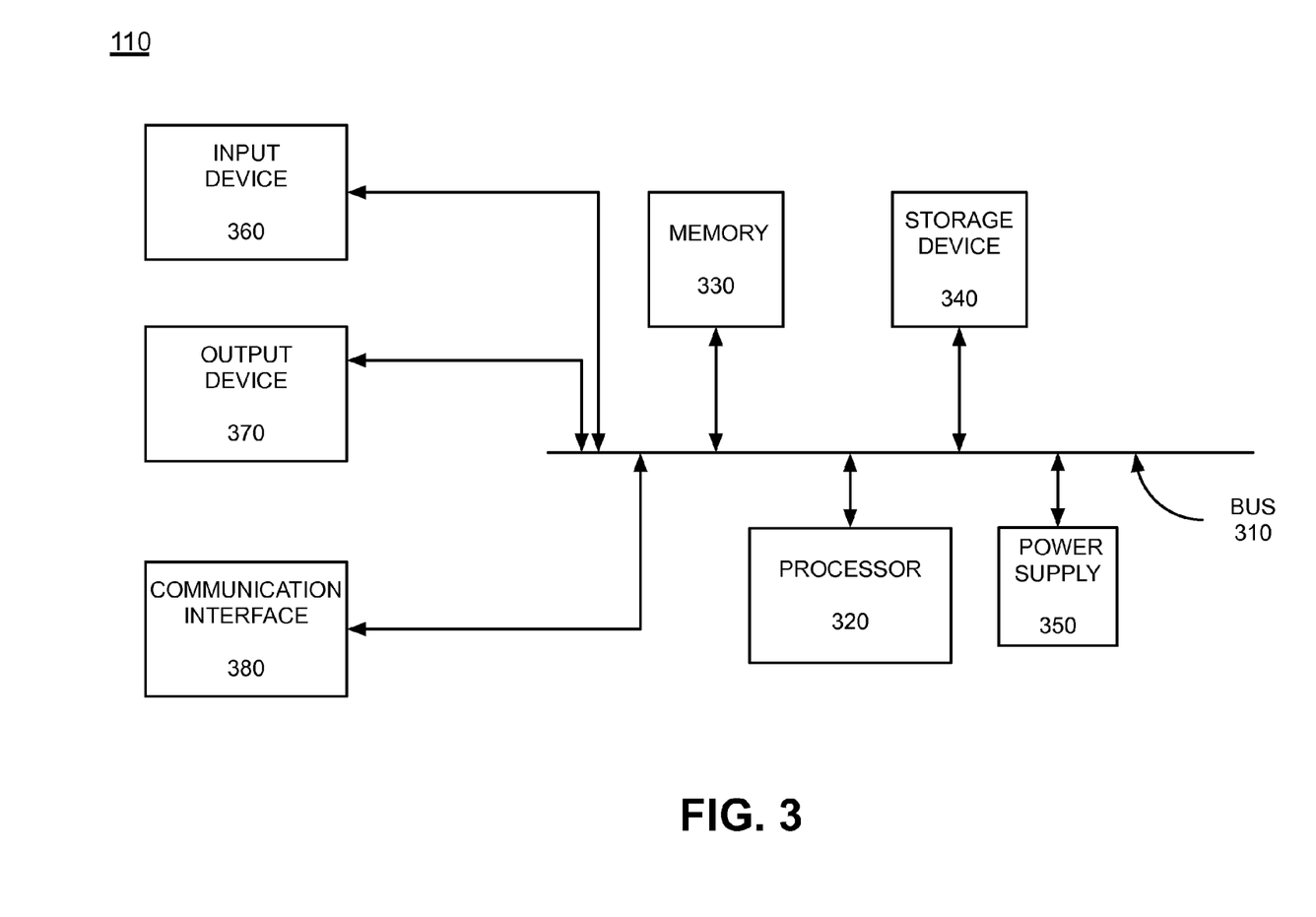
FIG. 3 is a is a diagram illustrating exemplary components of the user device of FIG. 2.

FIG. 3 is a diagram illustrating components of user device 110 according to an exemplary implementation. In some implementations, user devices 120-1 to 120-4 may be configured in a similar manner. Referring to FIG. 3, user device 110 may include bus 310, processor 320, memory 330, storage device 340, power supply 350, input device 360, output device 370, and communication interface 380. Bus 310 may include a path that permits communication among the elements of user device 110. It should be understood that user device 110 may be configured in a number of other ways and may include other or different elements. For example, user device 110 may include one or more modulators, demodulators, encoders, decoders, etc., for processing data.

Processor 320 may include one or more processors, microprocessors, application specific integrated circuits (ASICs), field programmable gate arrays (FPGAs), or other processing logic that may interpret and execute instructions. Memory 330 may include a random access memory (RAM) or another type of dynamic or static (e.g., read only memory (ROM)) storage device that may store information and instructions for execution by processor 320. Storage device 340 may include a magnetic and/or optical recording medium and its corresponding drive. Power supply 350 may include a battery or other power source used to power user device 110.

Input device 360 may include one or more mechanisms that permit a user to input information to user device 110, such as a control keys 240, keypad 250, microphone 260, a touch screen, such as display 230, a mouse, a pen, voice recognition and/or biometric mechanisms, etc.

Output device 370 may include one or more mechanisms that output information to the user, including a display, such as display 230, a printer, one or more speakers, such as speaker 220, a vibrating mechanism that provides haptic feedback to a user, etc.

Communication interface 380 may include any transceiver-like mechanism that enables user device 110 to communicate with other devices and/or systems. For example, communication interface 380 may include mechanisms for communicating via a network, such as a wireless network. In these implementations, communication interface 380 may include one or more radio frequency (RF) transmitters, receivers and/or transceivers and one or more antennas for transmitting and receiving RF data via a network. Communication interface 380 may also include an infrared (IR) transmitter and receiver and/or transceiver that enable user device 110 to communicate with other devices via infrared (IR) signals. Communication interface 380 may also include a modem or an Ethernet interface to a LAN or other network for communicating with other devices in system 100. In yet other implementations, communication interface 380 may be configured to include one or more short-range wireless technologies, such as radio frequency identifiers (RFID), Bluetooth®, or near field communication (NFC). Such technologies may provide for the exchange of data between devices in close physical proximity to each other in either an active or passive manner. Communication interface 380 may include other mechanisms for communicating with other devices 110 or via a network.

Such a network may include one or more wired, wireless and/or optical networks that are capable of receiving and transmitting data, voice and/or video signals, including multimedia signals that include voice, data and video information. For example, a network suitable for use with user device 110 may include one or more public switched telephone networks (PSTNs) or other type of switched network. The network may also include one or more wireless networks and may include a number of transmission towers for receiving wireless signals and forwarding the wireless signals toward the intended destination. The network may further include one or more packet switched networks, such as an Internet protocol (IP) based network, a local area network (LAN), a wide area network (WAN), a personal area network (PAN), an intranet, the Internet, or another type of network that is capable of transmitting data.

In some implementations consistent with embodiments described herein, user device 110 may provide a platform for enabling a user to make and receive telephone calls, send and receive electronic mail, text messages, instant messages (IMs), mobile IMs (MIMs), short message service (SMS) messages, etc., and execute various other applications. User device 110, as described in detail below, may also perform processing associated with tracking social interactions associated with user device 110 (e.g., between a user of device 110 and identified locations and/or other devices. User device 110 may perform these operations in response to processor 320 executing sequences of instructions contained in a computer-readable medium, such as memory 330. A computer-readable medium may be defined as a physical or logical memory device. The software instructions may be read into memory 330 from another computer-readable medium, such as data storage device 340, or from another device via communication interface 380. The software instructions contained in memory 330 may cause processor 320 to perform processes that will be described later. Alternatively, hard-wired circuitry may be used in place of or in combination with software instructions to implement processes consistent with the embodiments described herein. Thus, implementations described herein are not limited to any specific combination of hardware circuitry and software.

Figure 4A:
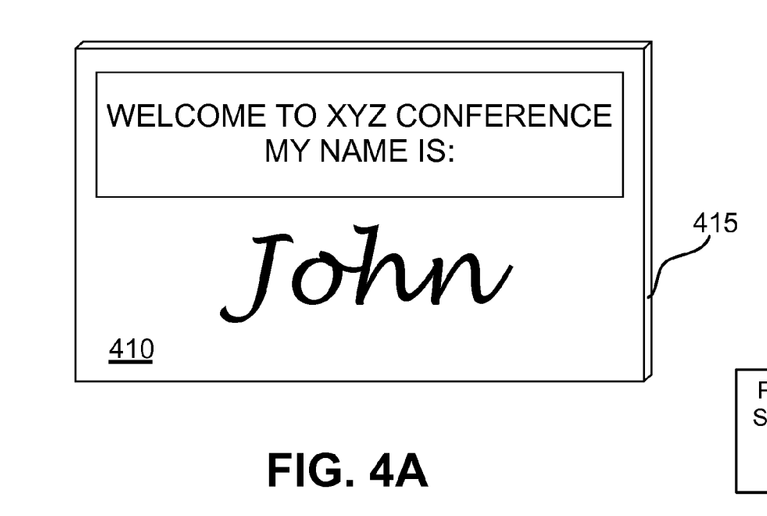
FIG. 4A is a diagram of another exemplary user device of FIG. 1.
Figure 4B:
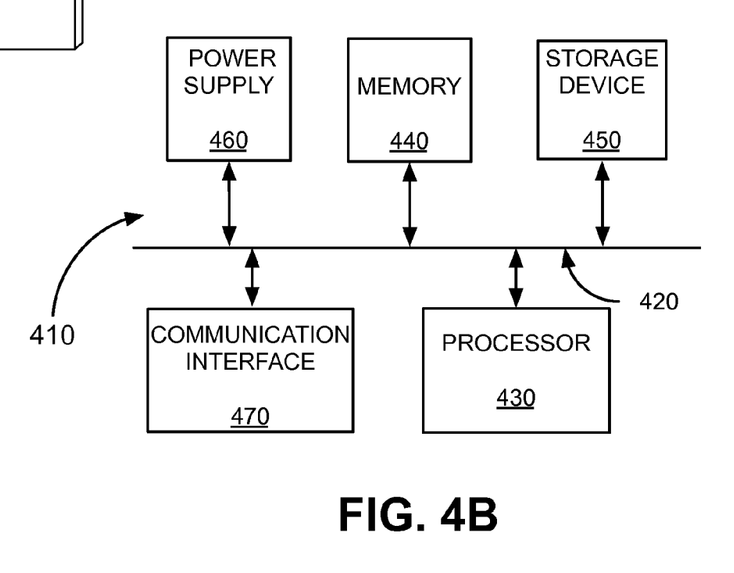
FIG. 4B is a is a diagram illustrating exemplary components of the user device of FIG. 4A.

FIG. 4A is a diagram of another exemplary user device 410 in which methods and systems described herein may be implemented. Referring to FIG. 4A, user device 410 may include a housing 415. Housing 415 may protect the components of user device 410 from outside elements. As illustrated, user device 410 may include a name tag device or other device configured to be carried by the user and operate without requiring direct user interaction. Other exemplary embodiments of such non-user interactive social interaction tracking devices may include a restaurant style pager, credit-card sized device etc. FIG. 4B is a diagram illustrating components of user device 410 according to the implementation of FIG. 4A. In some implementations, user devices 120-1 to 120-4 may be configured in a similar manner. Referring to FIG. 4B, user device 410 may include bus 420, processor 430, memory 440, storage device 450, power supply 460, and communication interface 470. Bus 420 may include a path that permits communication among the elements of user device 410. It should be understood that user device 410 may be configured in a number of other ways and may include other or different elements. For example, user device 410 may include one or more modulators, demodulators, encoders, decoders, etc., for processing data.

Processor 430 may include one or more processors, microprocessors, application specific integrated circuits (ASICs), field programmable gate arrays (FPGAs), or other processing logic that may interpret and execute instructions. Memory 440 may include a random access memory (RAM) or another type of dynamic or static (e.g., read only memory (ROM)) storage device that may store information and instructions for execution by processor 430. Storage device 450 may include a recording medium such as a hard disk drive, a solid state disk drive, a flash memory drive, etc. Power supply 460 may include a battery or other power source used to power user device 410.

Communication interface 470 may include any transceiver-like mechanism that enables user device 410 to communicate with other devices and/or systems. For example, communication interface 470 may include mechanisms for communicating via a network, such as a wireless network. In these implementations, communication interface 470 may include one or more radio frequency (RF) transmitters, receivers and/or transceivers and one or more antennas for transmitting and receiving RF data via a network. In some implementations, communication interface 470 may be configured to include one or more short-range wireless technologies, such as radio frequency identifiers (RFID), Bluetooth®, or near field communication (NFC). Such technologies may provide for the exchange of data between devices in close physical proximity to each other in either an active or passive manner. Communication interface 470 may include other mechanisms for communicating with other devices 410, with user devices 110 of FIG. 2, with user devices 120, or with other devices via a network.

Figure 5:
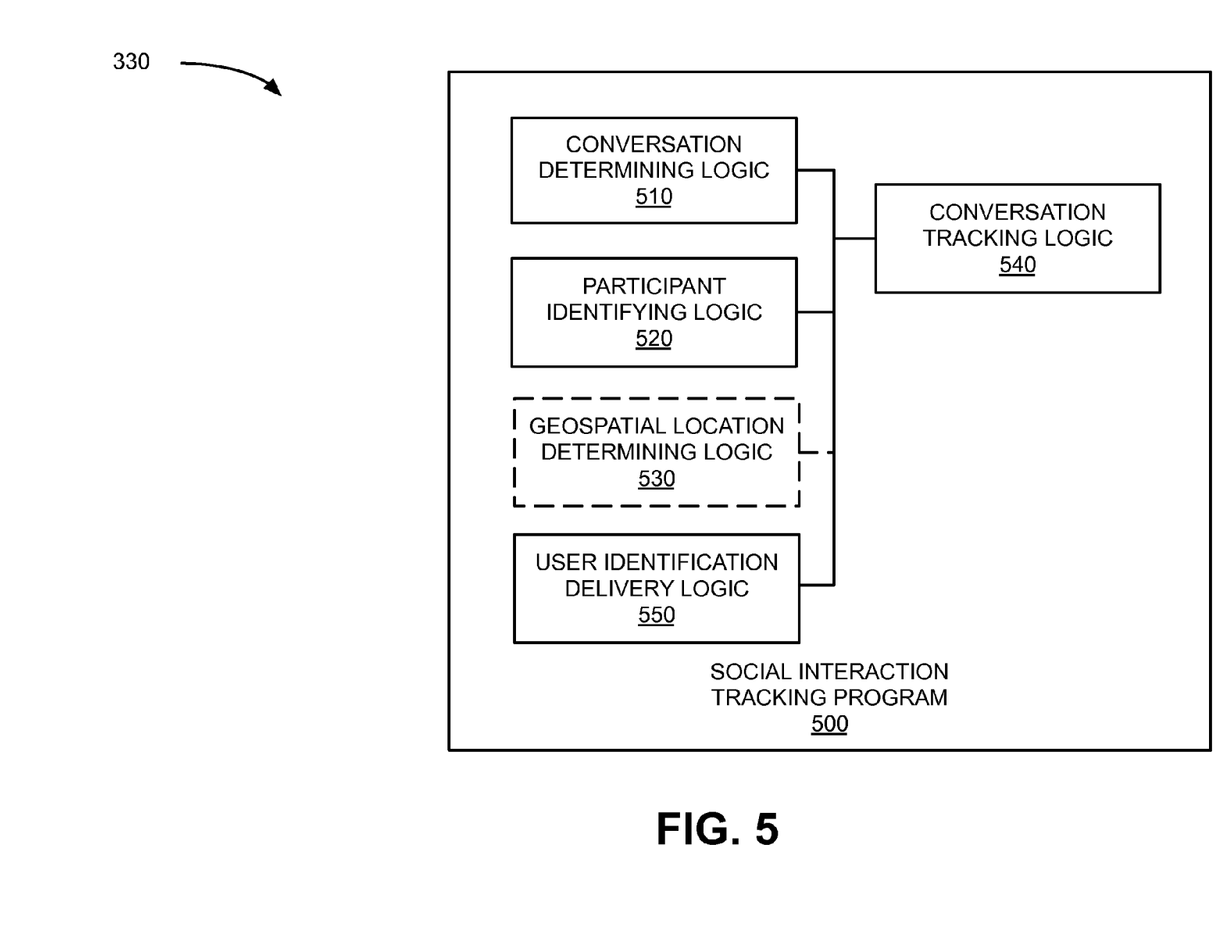
FIG. 5 is an exemplary functional block diagram of components implemented in the user device of FIG. 1.

FIG. 5 is an exemplary functional block diagram of components implemented in user device 110 of FIG. 2 and/or device 410 of FIG. 4A, such as by processor 320/430 executing a program stored in memory 330/440. The logical blocks illustrated in FIG. 5 may be implemented in software, hardware, or a combination of hardware and software. For the purposes of simplicity, the following description will be made with respect to user device 110. However, it should be understood that user device 410 may include substantially similar components.

Referring to FIG. 5, memory 330 may include a social interaction tracking program 500 executable by processor 320. As will be discussed in detail below, social interaction tracking program may be configured to enable user device 110 to monitor and track social experience environment 105 for interactions meeting configured requirements. As illustrated, social interaction tracking program 500 may include conversation determining logic 510, participant identifying logic 520, optional geospatial location determining logic 530, and user identification delivery logic 550. Social interaction tracking program 500 and its various logic components are shown in FIG. 5 as being included in user device 110. In alternative implementations, these components or a portion of these components may be located externally with respect to user device 110. For example, in some implementations, one or more of the components of social interaction tracking program 500 may be located in or executed by a remote network device. In such an implementation, user device 110 may provide information or access to the remote network device to facilitate tracking of social interactions involving user device 110. A user of user device 110 may subsequently view or retrieve tracking information from the remote network device.

Conversation determining logic 510 may include logic to monitor social interaction environment 105 and identify candidate devices with which device 110 may interact. For example, conversation determining logic 510 may continually monitor environment 105 for "in-range" devices. In-range devices may be devices, such as devices 120-1 to 120-4 configured to be discoverable or viewable by device 110 when in range of a wireless signal emitted therefrom. For example, communications interface 380 may include a Bluetooth® transceiver configured to identify other Bluetooth® enabled devices broadcasting within range of device 110's Bluetooth® transceiver. Alternatively, other forms of RF wireless signals may be used. Each device 110 and 120-1 to 120-4 may be configured to have a unique identifier associated therewith. This unique identifier may be broadcast by communication interface 380 of each device 110 and 120-1 to 120-4 to facilitate distinguishing between devices within environment 105.

Conversation determining logic 510, upon determination that a device (e.g., device 120-1) is "in-range," may estimate a proximity of the device (e.g., distance "d" of FIG. 1). In one exemplary implementation, conversation determining logic 510 may estimate the proximity of the detected device based on a signal power associated with the device. For example, using the Bluetooth® implementation discussed above, conversation determining logic 510 may monitor a signal level associated with the detected device's Bluetooth® transmitter. Based on various conditions associated with environment 105, the proximity of the detected device to device 110 may be correlated to the monitored signal strength.

In another implementation discussed in detail below, device 110 and each of devices 120-1 to 120-4 may actively and dynamically determine their respective positions within a social interaction environment, such as environment 105. In such an implementation, detected devices may broadcast or otherwise make their geospatial locations available to device 110. The proximity of device 110 to the detected device may then be determined based on the received geospatial location information.

Once the proximity of the detected device has been determined, conversation determining logic 510 may determine whether the device 110 and the detected device are within conversation range of each other. In one implementation, a conversation range threshold may be less than the in-range capabilities of device 110. For example, Class 2 Bluetooth® devices may detect the presence of other discoverable Class 2 Bluetooth® within 32 feet of each other. For class 1 Bluetooth® devices, this range extends to as far as 100 feet. The conversation range threshold may be considerably less than this distance. In one exemplary implementation, the conversation range threshold may be approximately 6 feet.

If it is determined that device 110 and the detected device are within conversation range of each other, conversation determining logic 510 may determine whether the user of device 110 and the user of the detected device are engaged in a conversation or other form of social interaction. In one implementation, this may be determined by monitoring a time during which the two devices are within conversation range of each other. For example, it may be determined that the user of device 110 and the user of the detected device are engaged in a conversation when device 110 and the detected device are within conversation range for at least 1 minute. Of course, this time period is exemplary only and any suitable duration may be used, based on the level of tracking detail desired. In one implementation, setting of a conversation time threshold may be incorporated into user configurable settings associated with social interaction tracking program 500.

Detected devices that are either outside of conversation range, or that are within range for a time period less than the conversation time threshold may be ignored for the purposes of tracking social interactions. However, when a detected device passes these thresholds, participant identifying logic 520 may then identify information relating to the detected device, as described below.

Participant identifying logic 520 may interact with other logic components of social interaction tracking program 500 to receive or retrieve information identifying a user of the detected device. For example, as described above, each device 110 and 120-1 to 120-4 may be associated with a unique identifier that is broadcast by the respective devices. In one implementation, participant identifying logic 520 may request user identification information from the detected device based on the received unique identifier. In another exemplary implementation, participant identifying logic 520 may query a remote device (e.g., a server) via a network, such as a LAN or the Internet, for the user identification information. In such an implementation, the remote request may reference the unique identifier associated with the detected device.

Conversation tracking logic 540 may include logic configured to store information corresponding to an identified social interaction. For example, conversation tracking logic 540 may be configured to receive a determination from conversation determining logic 510 and information from participant identifying logic 520. Conversation tracking logic 540 may store or track an identified social interaction based on the received information.

User identification delivery logic 550 may include logic configured to respond to user identification information requests received from other devices. For example, user identification delivery logic 550 may be configured to receive a request from one of devices 120, determine a type of request (e.g., business or personal, etc.), and transmit an appropriately formatted response via, e.g., communication interface 380.

Exemplary user identification information may include one or more of a name, business, title, address, and contact information, such as email address, telephone number, etc. In one implementation, the content of the user identification information may be configurable by either the user or by event organizers responsible for configuring and/or administering user devices 110/120 in system 100. In addition, a content of the user identification information may be selectable based on a type of device making the request and/or the type of event or social experience during which the request is received.

For example, user devices 110 and 120 may be configured to maintain both business and personal contact/identification information. For example, a user profile associated with devices 110 and 120 may be maintained, e.g., in storage device 340. For identification requests received during personal events, such as picnics, parties, reunions, etc., user identification delivery logic 550 may be configured to provide personal identification information, such as the user's home phone number, home address, personal email address, etc. For identification requests received during business-related events, such as seminars, company gatherings, networking events, etc., user identification delivery logic 550 may be configured to provide business-related identification information, such as the user's work address, business telephone number, and work email address.

In accordance with the embodiment of FIGS. 4A and 4B, users of device 410 may register with event organizers prior to receive individual devices 410. Identification information may be received from the users during the registration process. Each user may then be assigned a device 410 configured to include the provided identification information. Alternatively, devices 410 may perform social interaction tracking based on device identifier alone, where detailed social interaction tracking relating to specifics of the individuals interacted with may be matched up at a later time, for example, following upload of tracking information from devices 410 to a centralized tracking system or server. In this implementation, social interaction tracking information may be provided to a user following upload to a tracking system. In one exemplary implementation, users may be provided with web access to their social interaction tracking information hosted on a web server available via the Internet. Particular information, such as the user's name, business phone, company name, etc., may be accessed based on information previously provided to a host of an event in which devices 410 are provided to all attendees.

As will be described in additional detail below, device 110 may also optionally include geospatial location determination logic 530 that includes logic configured to enable social interaction tracking program 300 to dynamically determine a geospatial location of device 110 relative to environment 105. Although known devices incorporate global positioning system (GPS) technology, the technology is limited both in its ability to effectively ascertain a device's location indoors as well as its ability to provide location information relative to a specific environment. For example, a GPS-enabled device may be able to determine that a device is located at a particular longitude, latitude, and elevation, but not that the device is "next to the stairs" or "by the front door."

Consistent with embodiments described herein, geospatial location determination logic 530 may be configured to ascertain environment-specific location information relating to device 110. Exemplary details relating to the functionality of geospatial location determination logic 530 will be set forth in additional detail below, in relation to FIG. 8.

When it is determined that the detected device is within conversation range for at least the threshold amount of time, and when participant identifying logic 520 has received or retrieved at least one element of device identification information, conversation tracking logic 540 may store the interaction between device 110 and the detected device in, for example, a database maintained in storage device 340.

Figure 6:
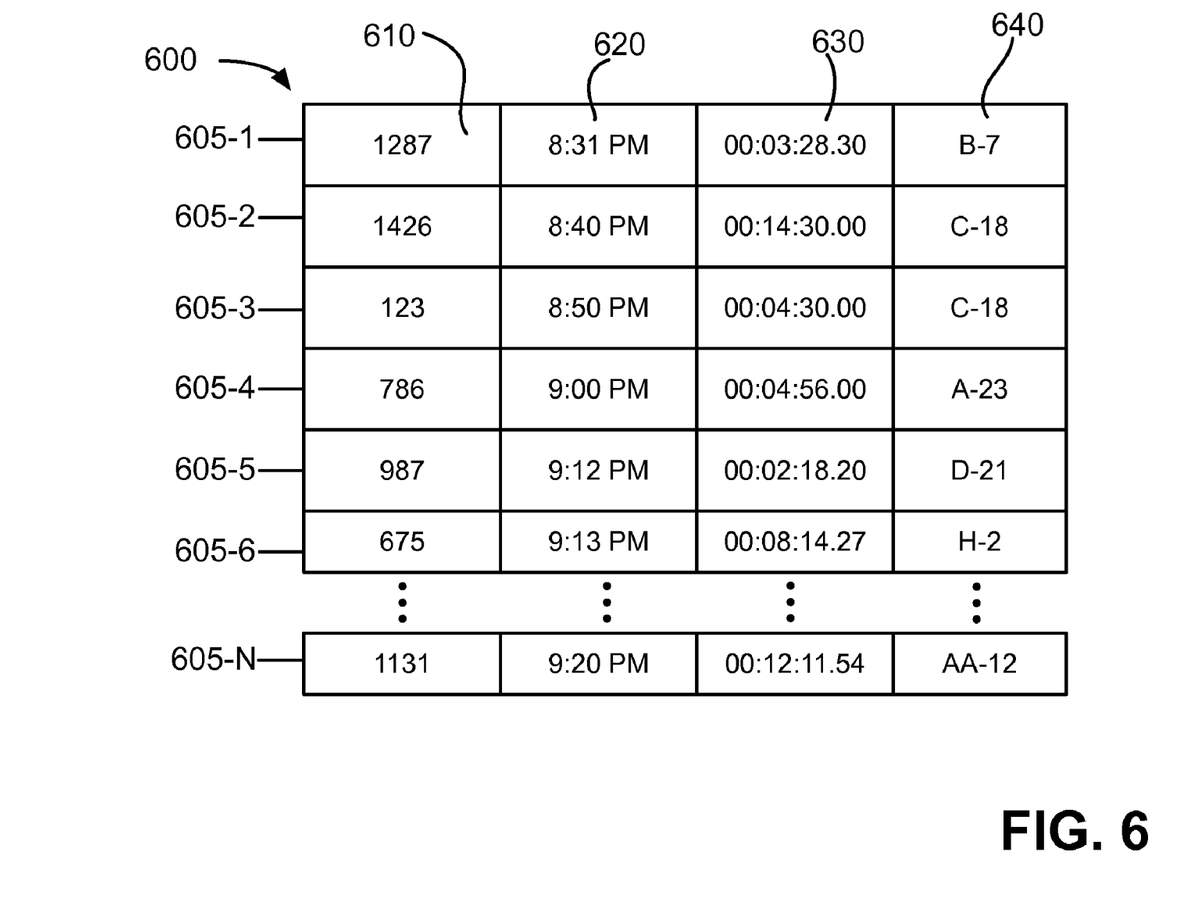
FIG. 6 is illustrates a structure of an exemplary database for storing social interaction tracking information.

FIG. 6 illustrates a structure of an exemplary database for storing social interaction tracking information. Referring to FIG. 6, database 600 may include a number of social interaction session entries 605-1 to 605-N (collectively "entries 605" or individually "entry 605"). Each entry 605 may include a participant identifier field 610, an interaction start time field 620, an interaction duration field 630, and an optional geospatial location field 640. As described above, participant identifying logic 520 may retrieve or otherwise obtain information relating to the user associated with the detected device. Conversation tracking logic 540 may store the obtained information in participant identifier field 610. In some implementations, participant identifier field 610 may include a plurality of fields, with the obtained information populating fields where appropriate.

Conversation tracking logic 540 may store a time associated with the start of the interaction in interaction start time field 620. For example, a time at which the detected device came within conversation range for the current social interaction session may be stored in interaction start time field 620. Conversation tracking logic 540 may store a current duration of the social interaction session with the detected device in interaction duration field 630. For example, conversation tracking logic 540 may subtract a current time from the time stored in interaction start time field 620.

In one implementation, social interaction tracking program 500 may update social interaction tracking information at a polling interval, such as every 10 seconds. At each polling interval, it may be determined whether current "conversations" are ongoing or have ended, or whether new "conversations" have begun. By updating at a periodic interval, a duration of each interaction session may be accurately represented in interaction duration field 630, without requiring separate activity on the part of social interaction tracking program 500. For example, once device 110 and the detected device are no longer within conversation range, conversation tracking logic 540 will cease tracking the interaction and, consequently, the previous value stored in interaction duration field 630 will become the final duration of that social interaction for that session. When it is determined that device 110 and the detected device remain in conversation range, conversation tracking logic 540 may update interaction duration field 630 to reflect the new value (current time-start time).

Conversation tracking logic 540 may also store the geospatial location of the social interaction session identified by geospatial location determining logic 530 in geospatial location field 640. In one implementation, the values stored in geospatial location field 640 may uniquely represent geospatial location of device 110 within social interaction environment 105.

For example, geospatial location determining logic 530 may be configured to identify a geospatial location of device 110 using a location grid unique to environment 105. For example, a ballroom hosting a seminar may be represented by a grid having an M×N grid of 2 foot by 2 foot elements, with each element in the grid having a unique identifier. For example, grid element A-2 may identify a location in the $A^{th}$ row and $2^{nd}$ column of the grid. In one embodiment, geospatial location of device 110 may identify the location of device 110 within an element in the M×N grid.

In this exemplary implementation, conversation tracking logic 540 may store the identified grid element in geospatial location field 640. In some implementations, the contents of geospatial location field 640 will not change throughout a given social interaction session, even when the identified location changes. In this example, the designated location identifies where the interaction started. In another implementation, geospatial location field 640 may include sub-fields configured to store changing location information throughout the social interaction session.

As will be described in detail below, by storing the location of device 110 during one or more social interaction sessions, a social interaction path (e.g., path 130 of FIG. 1) may be recreated in relation to the geospatial layout of social environment 105.

Figure 7:
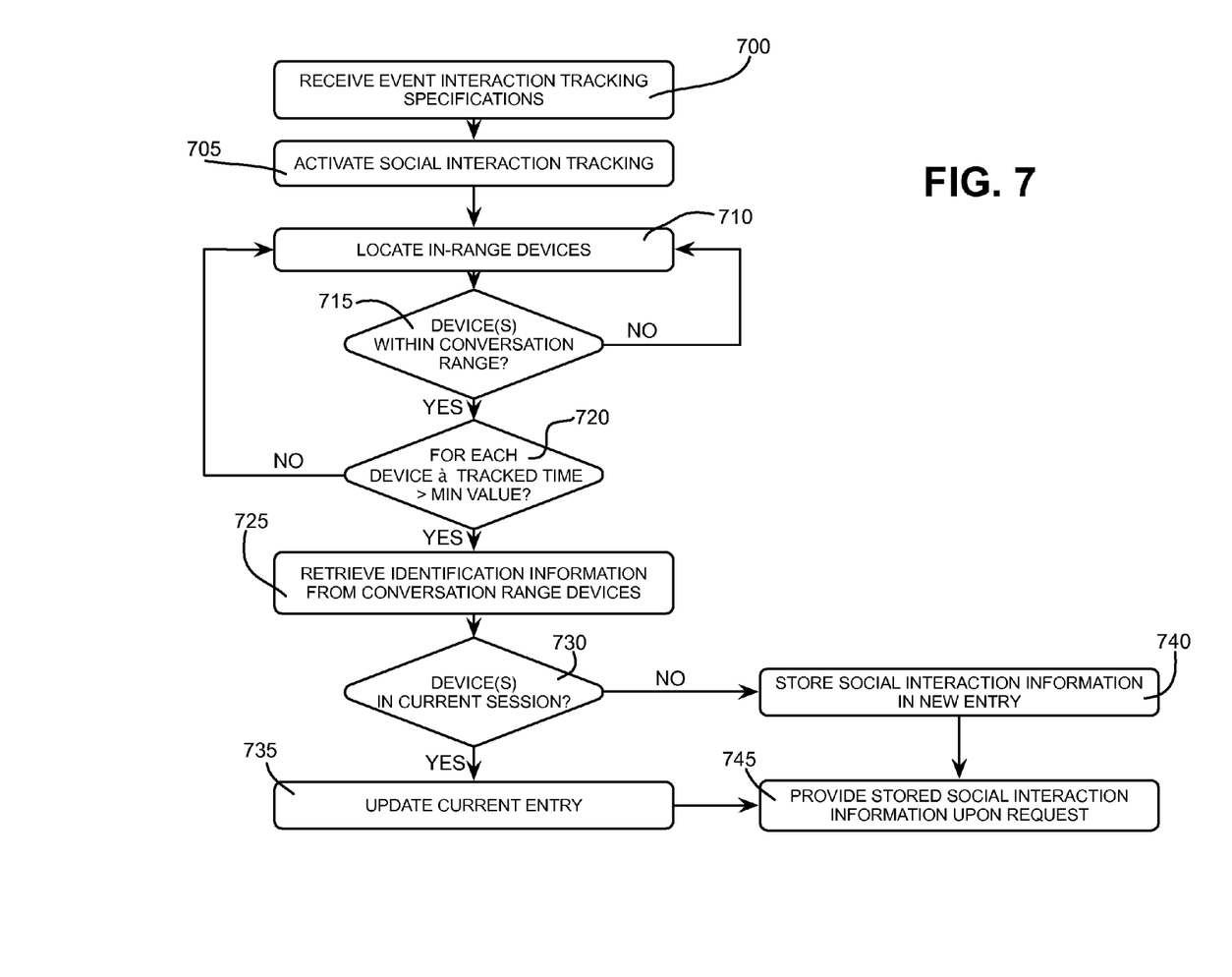
FIG. 7 is a flow diagram illustrating exemplary processing associated with tracking social interactions in system of FIG. 1.

FIG. 7 is a flow diagram illustrating exemplary processing associated with tracking social interactions in system 100. Processing may begin with device 110 receiving event interaction tracking specification information (block 700). For example, device 110 may receive profile information from the user of device 110, location determining information (e.g., specifications of a manner in which geospatial information is to be determined for the session), conversation threshold information setting a minimum conversation time and a minimum distance at which an interaction is to be tracked, etc. This information may be provided via, for example, input device 360. Social interaction tracking program 500 may be activated (block 705). In some implementations, activation of social interaction tracking program 500 may be initiated by a user request, e.g., by selecting the application from a list of available applications on device 110. In other implementations (such as that described above in connection with FIGS. 4A and 4B), social interaction tracking program 500 may be activated prior to being distributed to a user, or remotely by a social interaction tracking management entity.

Upon activation, device 110, at a designated polling interval, may identify other devices in range of device 110 (block 710). For each identified in range device, it may be determined (e.g., by conversation determining logic 510), whether the device is in conversation range (block 715). For example, as described above, conversation determining logic 510 may determine a proximity of each detected device to device 110, e.g., based on a power of a signal received from the detected device. When the determined proximity is greater than the conversation threshold, the detected device is determined to be out of conversation range (block 715-NO) and the process may return to block 710 for the next polling period for that device.

When the determined proximity is less than or equal to the conversation threshold, the detected device is determined to be in conversation range (block 715-YES), device 110 may determine whether each conversation range device has been within conversation range for at least a conversation time threshold (block 720). As discussed above, device 110 may poll detected devices at a predefined polling interval. To avoid tracking devices in proximity for only a short period of time (e.g., parties passing by each other, parties quickly saying Hello, etc.), device 110 may be configured to track a social interaction only when the duration of the interaction meets or exceeds at least a predefined minimum conversation time threshold.

If the social interaction does not meet or exceed the minimum conversation time threshold for a particular detected device (block 720-NO), social interaction tracking may cease with respect to that device and processing may return to block 710 for the next polling period. If the social interaction does meet or exceed the minimum conversation time threshold for a particular detected device (block 720-YES), device 110 may retrieve identification information for each detected conversation range device meeting or exceeding the time threshold (block 725). For example, participant identifying logic 520 may query each conversation range device meeting the conversation time threshold for identification information. In one implementation, participant identifying logic 520 may initially determine whether identification information has been previously received for the detected conversation range device. In an alternative implementation, a remote device may be queried for the identification information based on unique identifier associated with the detected conversation range device.

Once identification information has been received, social interaction tracking program 500 may determine whether the detected device is a participant in a current social interaction session (block 730). For example, entries in a database of social interaction tracking information (e.g., database 600) may be compared to a detected device. For identified devices having at least one prior entry in the database (e.g., database 600), a current time may be compared to prior times associated with the identified entries. For example, a current time may be compared to an entry's interaction start time (e.g., field 620) plus duration (e.g., field 630) plus polling interval. When the current time is sequential with a prior entry, the social interaction session may be considered a continuation of a prior session (block 730-YES). This avoids duplicate entries for a single social interaction. Updated social interaction tracking information may be stored in the identified entry (block 735). For example, duration field 630 may be updated to reflect the current duration.

When it is determined that the detected device is not a participant in a current social interaction session (block 730-NO) (either because no prior matching entries are found in database 600, or that any matching entries are not time continuous), social interaction tracking information may be stored (block 740). For example, a new entry will be formed in database 600.

Following storage of at least one tracked social interaction (e.g., in database 600), information regarding the tracked social interaction may be accessed and/or subsequently provided upon request (block 745). In one implementation, social tracking information may be reviewed via an interface on device 110. For example, device 110 may be configured to provider users with a social interaction history interface. The social interaction history interface may retrieve information relating to one or more tracked social interactions (e.g., from database 600) for a designated event or time period. The retrieved information may be provided to the user in a number of ways. For example, a listing of social interactions may be provided via display 230. Alternatively, a map of social interaction environment 105 may be provided, where retrieved tracked social interactions are overlayed on the map. In this embodiment, an icon or other graphical indicator may represent each interaction. Selection of an interaction icon may result in display of particular social interaction information corresponding to the selected interaction.

In an alternative implementation, device 110 may be configured to upload or otherwise transfer the stored social interaction information to a remote device (e.g., a server). For example, wireless networking capabilities of device 110 (e.g., communication interface 380) may be used to enable device 110 to upload the stored social interaction information wireless to a designated remote device, such as a web or FTP (file transfer protocol) server. In other implementations, the stored social interaction may be transferred via a wired cable (e.g., a USB cable) or by physical removal of storage device 340 (e.g., a memory card) from device 110 and insertion of the removed storage device into a remote device.

In any event, once transferred to the remote device, the stored social interaction information may be made available for subsequent retrieval, e.g., by the user of device 110 or by others. In one implementation, the stored social interaction information may be provided via a web-based interface.

Figure 8:
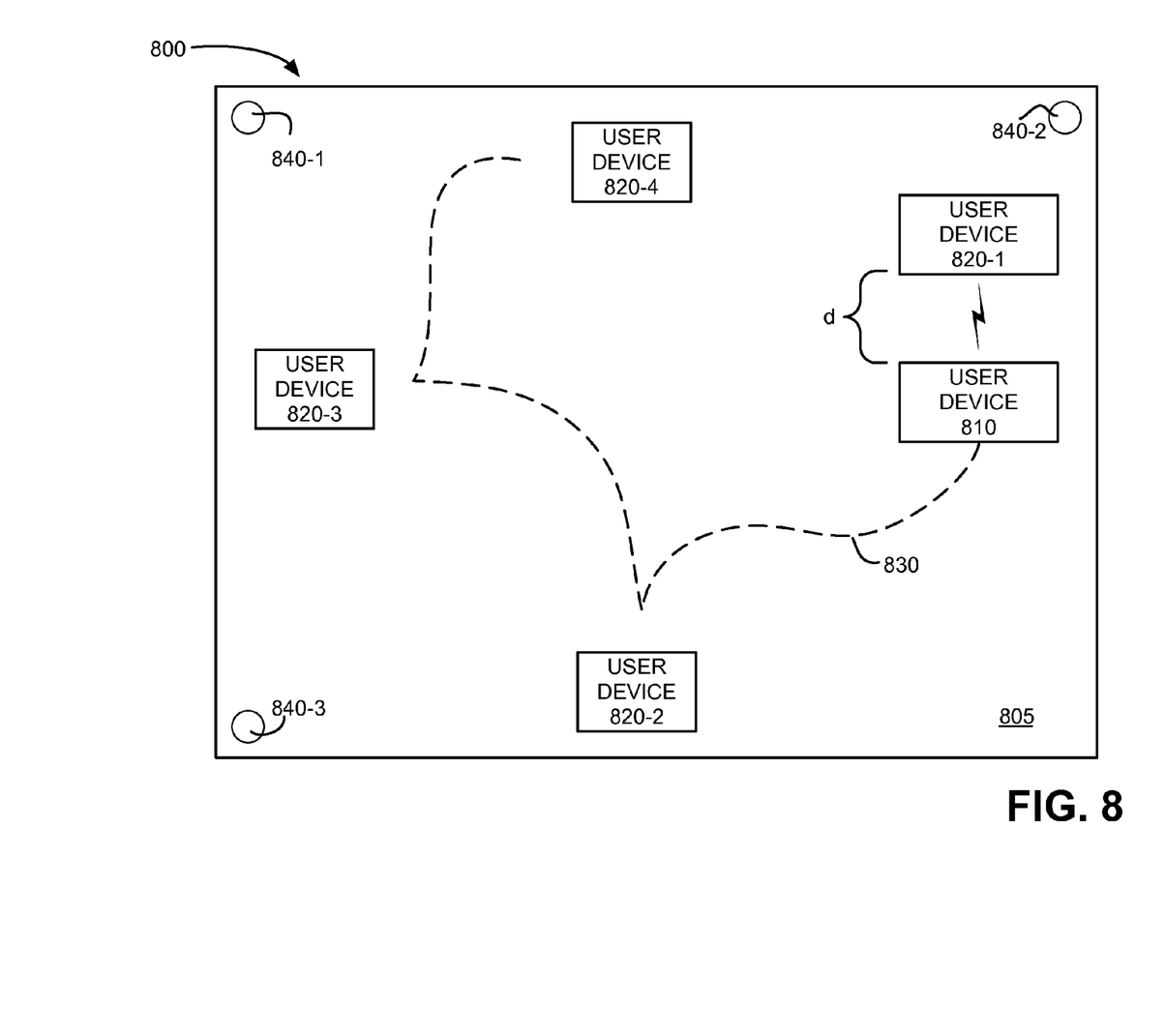
FIG. 8 is a block diagram of another exemplary system in which systems and methods described herein may be implemented.

FIG. 8 is a block diagram of an exemplary system 800 in which systems and methods described herein may be implemented. System 800 may include an environment 805, a first user device 810, a plurality of user devices 820-1 to 820-4 (collectively referred to as user devices 820) with which a use of user device 810 may interact during a social interaction experience, a path 830 indicating a path followed by a user of first user device 810 during a social interaction session, and a plurality of geospatial location beacons 840-1 to 840-3 (collectively referred to as geospatial location beacons 840). As with the embodiment of FIG. 1, a user of first user device 810 may socially interact with one or more of users of devices 820-1 to 820-4 during a social interaction session. Proximity between devices 810 and 820 may be represented by distance "d" in FIG. 8.

The elements of FIG. 8 are similar to those described above with respect to FIG. 1 with the addition of geospatial location beacons 840. As described above in relation to FIG. 5, social interaction tracking program 500 may include a geospatial location determining logic 530 configured to ascertain a geospatial location of device (e.g., device 810) within a social interaction environment (e.g., environment 805).

In one implementation consistent with embodiments described herein, geospatial location beacons 840 may facilitate this processing. More specifically, geospatial location beacons 840 may be correlated to environment 805 and may be configured to include one or more radio frequency transmitters. Each radio frequency transmitter may be further configured to transmit a radio frequency signal usable by geospatial location determining logic 530 in determining the geospatial location of device 810. For example, each radio frequency signal may be configured to include a synchronized time as well as the location of the beacon in environment 805. Because the timing of the signals is synchronized and the environment-oriented location of each transmitter is known from the contents of the respective signals, a time taken for the geospatial location determining logic 530 in device 810 receiver to "receive" a signal from each beacon 840 may be used to triangulate or identify the distance from each beacon 840 to device 810. Determining the distances to each of the at least three beacons 840 may result in pinpoint location of device 810 relative to environment 805. The determined location information may be stored, e.g., in geospatial location field 640 of database 600.

Implementations described herein relate to a device, method, and system for facilitating the observation and tracking of social interactions between device users. In some implementations, a mobile telephone or other portable electronics device may include one or more transceiver mechanisms for locating and identifying other electronic devices. Logic associated with the device may be configured to track interactions with other identified devices based on a set of predetermined conditions.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a mobile or portable device configured to performing social interaction tracking processing and analysis functions. In other implementations, features described herein may be implemented mainly in one or more devices remote from the mobile or portable device. For example, the mobile device may be configured to transmit a continuous or periodic stream of information relating to any detected devices to a remote social interaction tracking device. The processing and tracking of any identified social interactions may be performed at the remote social interaction device, rather than the mobile device.

Further, while series of acts have been described with respect to FIG. 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
 a communication interface configured to transmit and receive communications from another device physically separate from the device; and
 logic configured to:
  determine whether a user of the device is in a social interaction with a user of the other device;
  obtain identification information associated with the other device when the user of the device is in a social interaction with the user of the other device;
  store the obtained identification information associated with the other device; and
  track the social interaction with the user of the other device based on the stored information.

2. The device of claim 1, wherein the communication interface is configured to wirelessly transmit and receive communications from the other device.

3. The device of claim 1, wherein the logic configured to determine whether the user of the device is in a social interaction with the user of the other device is further configured to:
 determine whether the other device is in-range of the communication interface;
 determine a proximity of the other device to the device when the other device is in-range of the communication interface;
 determine whether the other device is within conversation range of the device based on the proximity of the other device to the device; and
 determine that the user of the device is in a social interaction with the user of the other device when other device is within conversation range of the device.

4. The device of claim 3, wherein the logic configured to determine a proximity of the other device to the device is further configured to:
 monitor a signal strength associated with the other device; and
 determine the proximity of the other device to the device based on the signal strength associated with the other device.

5. The device of claim 4, wherein the signal strength associated with the other device comprises a Bluetooth signal strength generated by a Bluetooth transceiver in the other device.

6. The device of claim 1, wherein the logic configured to obtain identification information associated with the other device is further configured to:
 receive an identifier associated with the other device;
 determine whether identification information associated with the other device has been previously received based on the received identifier;
 request the identification information associated with the other device when the identification information associated with the other device has not been previously received;
 receive the requested identification information; and
 store the received identification information in a memory.

7. The device of claim 1, wherein the logic configured to store the obtained identification information associated with the other device is further configured to:
 determine a start time associated with the social interaction;
 determine a duration of the social interaction; and
 store the identification information, the start time, and the duration in a memory associated with the device.

8. The device of claim 7, wherein the logic configured to store the obtained identification information associated with the other device is further configured to:
 determine a geospatial location associated with the device relative to an environment associated with the social interaction; and
 store the identification information, the start time, the duration, and the geospatial location in the memory.

9. The device of claim 8, wherein the logic configured to determine a geospatial location associated with the device relative to the environment associated with the social interaction is further configured to:
 receive signals from geospatial location beacons within the environment; and
 determine the geospatial location associated with the device based on the received signals.

10. The device of claim 9, wherein each of the signals comprises a synchronized time and location information relating to the respective geospatial location beacon.

11. The device of claim 1, wherein the logic is further configured to:
 receive one or more elements of identification information from the user of the device;
 store the one or more elements in a profile;
 determine which of the one or more elements of identification information in the profile to transmit to the other device;

retrieve the determined one or more elements of identification information from the profile; and transmit the determined one or more elements of identification information to the other device.

12. The device of claim 11, wherein the one or more elements of identification information may include personal identification information and business-related identification information, and wherein the logic to determine which of the one or more elements of identification information in the profile to transmit to the other device is further configured to:

receive instructions to transmit one of the personal identification information or the business-related identification information based on one of one environment associated with the social interaction or the identification information associated with the other device.

13. The device of claim 1, wherein the logic is further configured to:

store a social interaction time and duration with the identification information associated with the other device; and provide the stored social interaction time, duration, and identification information associated with the other device for review at a subsequent time.

14. The device of claim 13, wherein the logic configured to provide the stored social interaction time, duration, and identification information associated with the other device for review at a subsequent time is further configured to:

display a listing of stored social interactions based on the stored social interaction time, duration, and identification information associated with the other device; or provide a map of a social interaction environment designating historical social interactions based on the stored social interaction time, duration, and identification information associated with the other device.

15. A method, comprising:

determining, by a first device, whether a user of the first device is in a social interaction with a user of a second device physically separate from the first device;

obtaining, by the first device, identification information associated with the second device when the user of the first device is in a social interaction with the user of the second device;

storing the obtained identification information associated with the second device; and tracking the social interaction with the user of the second device based on the stored information.

16. The method of claim 15, further comprising:

determining whether the second device is in-range of the first device;

determining a proximity of the second device to the first device when the second device is in-range;

determine whether the other device is within conversation range of the first device based on the proximity of the second device to the first device; and determine that the user of the first device is in a social interaction with the user of the second device when the second device is within conversation range of the first device.

17. The method of claim 16, wherein determining the proximity of the second device to the first device when the second device is in-range further comprises:

monitor a signal strength associated with the second device; and determine the proximity of the second device to the first device based on the signal strength associated with the second device.

18. The method of claim 15, wherein storing the obtained identification information associated with the second device further comprises:

determining a start time associated with the social interaction;

determining a duration of the social interaction;

determining a geospatial location associated with the first device relative to an environment associated with the social interaction; and storing the identification information, the start time, the duration, and the geospatial location in a memory associated with the first device.

19. A non-transitory computer-readable medium having stored thereon sequences of instructions which, when executed by at least one processor, cause the at least one processor to:

determine whether a user of a first device is in a social interaction with a user of a second device;

obtain identification information associated with the second device when the user of the first device is in a social interaction with the user of the second device;

generate social interaction tracking information based on the obtained identification information associated with the second device, wherein the social interaction tracking information includes a time and a duration of the social interaction;

store the social interaction tracking information; and provide the stored social interaction tracking information upon request at a subsequent time.

20. The non-transitory computer-readable medium of claim 19, further including instructions for causing the at least one processor to:

upload the social interaction tracking information to a remote device via a network.

* * * * *